(12) United States Patent
Li et al.

(10) Patent No.: US 9,541,650 B2
(45) Date of Patent: Jan. 10, 2017

(54) SATELLITE POSITIONING METHOD, SATELLITE PSEUDORANGE CALCULATION APPARATUS AND SATELLITE PSEUDORANGE CALCULATION METHOD

(71) Applicant: Institute For Information Industry, Taipei (TW)

(72) Inventors: Chih-Hung Li, New Taipei (TW); He-Sheng Wang, Keelung (TW); Emery Jou, Taipei (TW); Shu-Min Chuang, Taipei (TW); Shan-Yaun Yang, New Taipei (TW); Chih-Min Hsu, Yilan (TW)

(73) Assignee: Institute For Information Industry, Taipei (TW)

( * ) Notice: Subject to any disclaimer, the term of this patent is extended or adjusted under 35 U.S.C. 154(b) by 1161 days.

(21) Appl. No.: 13/714,749

(22) Filed: Dec. 14, 2012

(65) Prior Publication Data
US 2014/0152500 A1    Jun. 5, 2014

(30) Foreign Application Priority Data
Dec. 5, 2012    (TW) .............................. 101145601 A

(51) Int. Cl.
G01S 19/30    (2010.01)
G01S 19/42    (2010.01)
G01S 11/02    (2010.01)

(52) U.S. Cl.
CPC .............. *G01S 19/30* (2013.01); *G01S 19/42* (2013.01); *G01S 11/02* (2013.01)

(58) Field of Classification Search
CPC ...................................................... G01S 19/30
See application file for complete search history.

(56) References Cited

U.S. PATENT DOCUMENTS

| 4,797,677 A | 1/1989 | MacDoran et al. |
| 6,417,801 B1 | 7/2002 | Van Diggelen |

(Continued)

FOREIGN PATENT DOCUMENTS

| CN | 1345418 A | 4/2002 |
| CN | 101158718 A | 4/2008 |

(Continued)

OTHER PUBLICATIONS

He, Y. et al. "Iterative Least Squares Method for Global Positioning System," Advances in Radio Science 9, 203-208, 2011.*

(Continued)

*Primary Examiner* — Gregory C Issing
(74) *Attorney, Agent, or Firm* — Skaar Ulbrich Macari, P.A.

(57) ABSTRACT

A satellite positioning method, a satellite pseudorange calculation apparatus and a satellite pseudorange calculation method thereof are provided. The satellite pseudorange calculation apparatus is used for calculating a pseudorange between a satellite and a satellite positioning receiving device, wherein the pseudorange includes an integer code value and a fractional code value. The satellite pseudorange calculation apparatus comprises a receiver and a processor electrically connected with the receiver. The receiver is configured to receive a code phase from a satellite signal acquisition unit, and the processor is configured to calculate the fractional code value according to the code phase. The receiver is further configured to define an approximation position and calculate the integer code value according to the approximate position and the fractional code value. The satellite positioning method is used for positioning the satellite positioning receiving device.

9 Claims, 7 Drawing Sheets

(56) References Cited

U.S. PATENT DOCUMENTS

| | | | | |
|---|---|---|---|---|
| 6,473,694 | B1* | 10/2002 | Akopian | G01S 19/42 342/357.25 |
| 7,196,660 | B2* | 3/2007 | Abraham | G01S 5/0018 342/357.25 |
| 7,463,188 | B1* | 12/2008 | McBurney | G01S 19/06 342/357.43 |
| 7,535,414 | B2* | 5/2009 | Han | G01S 19/256 342/357.27 |
| 8,013,788 | B2* | 9/2011 | Duffett-Smith | G01S 19/06 342/357.27 |
| 2003/0236621 | A1 | 12/2003 | Sirola et al. | |
| 2006/0273954 | A1* | 12/2006 | Diggelen | G01S 19/42 342/357.25 |
| 2007/0058700 | A1 | 3/2007 | Fenton | |
| 2007/0171124 | A1* | 7/2007 | Weill | G01S 19/42 342/357.25 |
| 2009/0002226 | A1* | 1/2009 | Mo | G01S 19/42 342/357.25 |
| 2009/0309794 | A1 | 12/2009 | Diggelen et al. | |

FOREIGN PATENT DOCUMENTS

| | | |
|---|---|---|
| CN | 101809409 A | 8/2010 |
| CN | 102033236 A | 4/2011 |
| WO | 0114903 A1 | 3/2001 |

OTHER PUBLICATIONS

"Appendix A: Linearizing the GPS Pseudorange Equations." http://scholar.lib.vt.edu/theses/available/etd-112516142975720/unrestricted/appa.pdf . pp. 224-228. 1998.*

Search report from the Netherlands Intellectual Property Office regarding the NL counterpart applicaiton for the present U.S. patent application, Nov. 11, 2013, 11 pages.

Office Action to the corresponding Chinese Patent Application No. 201210531605.4 rendered by the State Intellectual Property Office of China (SIPO) on Oct. 9, 2015, 20 pages (including English translation).

\* cited by examiner

SATELLITE POSITIONING METHOD, SATELLITE PSEUDORANGE CALCULATION APPARATUS AND SATELLITE PSEUDORANGE CALCULATION METHOD

PRIORITY

This application claims priority to Taiwan Patent Application No. 101145601 filed on Dec. 5, 2012, which is hereby incorporated herein by reference in its entirety.

FIELD

The present invention relates to a satellite positioning method, a satellite pseudorange calculation apparatus and a satellite pseudorange calculation method thereof. More particularly, the present invention provides a satellite positioning method, a satellite pseudorange calculation apparatus and a satellite pseudorange calculation method thereof that relate to quick cold start.

BACKGROUND

Satellite positioning has numerous advantages. For example, the satellite positioning has a high global coverage rate (up to 98%), a high precision and a wide application scope, is quick and time-saving, and allows for mobile positioning. Therefore, the satellite positioning has become an important representative technology for outdoor positioning.

The positioning process of a conventional satellite positioning receiving device may be divided into three procedures, namely, an acquisition procedure, a tracking procedure and a positioning procedure. During the acquisition procedure, the satellite positioning receiving device calculates a code phase and a Doppler shift of a visible satellite in the sky. During the tracking procedure, the satellite positioning receiving device synchronizes a local signal to the satellite signal to analyze parameters such as the satellite ephemeris. The satellite ephemeris is a parameter indispensable for the subsequent positioning procedure, and comprises an absolute transmitting time of the satellite and the satellite orbit information. During the positioning procedure, the satellite positioning receiving device obtains the correct satellite position and the correct pseudorange between the satellite and the satellite positioning receiving device according to the parameters including the satellite ephemeris and calculates a position where it is located.

For the conventional satellite positioning receiving device, it will be impossible to obtain the absolute transmitting time of the satellite and the satellite orbit information once the conventional satellite positioning receiving device fails to obtain the satellite ephemeris during the tracking procedure. Absence of the absolute transmitting time of the satellite and the satellite orbit information will make it impossible for the conventional satellite positioning receiving device to obtain the correct satellite position and the correct pseudorange between the satellite and the satellite positioning receiving device, and as a result, the position of the user cannot be calculated.

The conventional satellite positioning receiving device may comprise a radio frequency (RF) front-end unit, a satellite signal acquisition unit, a satellite signal tracking unit and a position calculating unit. The RF front-end unit is used as a communication interface between the satellite and the satellite positioning receiving device, and the satellite signal acquisition unit, the satellite signal tracking unit and the position calculating unit are used to perform the acquisition procedure, the tracking procedure and the positioning procedure respectively. Because the satellite transmits the satellite ephemeris at a very low transmission rate (about 50 bps), it takes the satellite signal tracking unit much time (about 30 seconds to a few minutes) to download and process a whole piece of satellite ephemeris data (including the absolute transmitting time of the satellite and the satellite orbit information). Therefore, most of conventional satellite positioning receiving devices are confronted with an urgent problem to be tackled: that is, the speed of an initial positioning (or termed as "cold start") is very low, so the user has to wait for a too long time, which may have an effect on the applications of the satellite positioning receiving devices.

Accordingly, an urgent need exists in the art to improve the problem that the conventional satellite positioning receiving devices have a very low initial positioning speed because the satellite signal tracking unit thereof must spend much time to download from the satellite and process a whole ephemeris of the satellite.

SUMMARY

The primary objective of the present invention is to provide a satellite positioning method, a satellite pseudorange calculation apparatus and a satellite pseudorange calculation method thereof. The satellite positioning method, the satellite pseudorange calculation apparatus and the satellite pseudorange calculation method thereof of the present invention allow the conventional satellite positioning receiving device to, in the absence of the satellite ephemeris, directly calculate the pseudorange between the satellite and the satellite positioning receiving device and the absolute transmitting time of the satellite so as to calculate the position of the user (i.e., the position of the satellite positioning receiving device). In other words, the satellite positioning method, the satellite pseudorange calculation apparatus and the satellite pseudorange calculation method thereof of the present invention can be used to replace or be used with the satellite signal tracking unit of the conventional satellite positioning receiving device. Therefore, it can be effectively improved that the conventional satellite positioning receiving device is with slow initial positioning speed because the satellite signal tracking unit thereof must spend much time to download and process a whole satellite ephemeris from the satellite.

To achieve the aforesaid objective, certain embodiments of the present invention provides a satellite pseudorange calculation apparatus, which is configured to calculate a pseudorange between a satellite and a satellite positioning receiving device. The pseudorange comprises an integer code value and a fractional code value. The satellite pseudorange calculation apparatus comprises a receiver and a processor electrically connected with the receiver. The receiver is configured to receive a code phase from a satellite signal acquisition unit. The processor is configured to execute the following operations: calculating the fractional code value according to the code phase; defining an approximation position; and calculating the integer code value according to the approximation position and the fractional code value.

To achieve the aforesaid objective, certain embodiments of the present invention further provides a satellite pseudorange calculation method for calculating a pseudorange between a satellite and a satellite positioning receiving device. The pseudorange comprises an integer code value and a fractional code value. The satellite pseudorange calculation method comprises the following steps of:

(a) enabling a receiver of the satellite positioning receiving device to receive a code phase from a satellite signal acquisition unit of the satellite positioning receiving device;

(b) enabling a processor, which is electrically connected to the receiver, of the satellite positioning receiving device to calculate the fractional code value according to the code phase;

(c) enabling the processor to define an approximation position; and (d) enabling the processor to calculate the integer code value according to the approximation position and the fractional code value.

To achieve the aforesaid objective, certain embodiments of the present invention further provides a satellite positioning method for positioning a satellite positioning receiving device. The satellite positioning receiving device includes a pseudorange from each of a plurality of satellites respectively, and each of the pseudoranges comprises an integer code value and a fractional code value. The satellite positioning method comprises the following steps of:

(a) enabling a receiver of the satellite positioning receiving device to receive a code phase of one of the satellites from a satellite signal acquisition unit of the satellite positioning receiving device;

(b) enabling a processor, which is electrically connected to the receiver, of the satellite positioning receiving device to calculate the fractional code value according to the code phase;

(c) enabling the processor to define an approximation position;

(d) enabling the processor to calculate the integer code value according to the approximation position and the fractional code value;

(e) repeating the step (a) to step (d) to obtain the pseudoranges between the satellites and the satellite positioning receiving device respectively; and (f) enabling a position calculation unit, which is electrically connected to the processor, of the satellite positioning receiving device to position the satellite positioning receiving device according to the pseudoranges.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to example embodiments thereof. It shall be appreciated that, these example embodiments are not intended to limit the present invention to any specific example, embodiments, environments, applications or particular implementations described in these embodiments. Therefore, description of these embodiments is only for purpose of illustration rather than to limit the present invention. In the following embodiments and the attached drawings, elements not directly related to the present invention are omitted from depiction; and dimensional relationships among individual elements in the attached drawings are illustrated only for ease of understanding but not to limit the actual scale.

Figure 1:
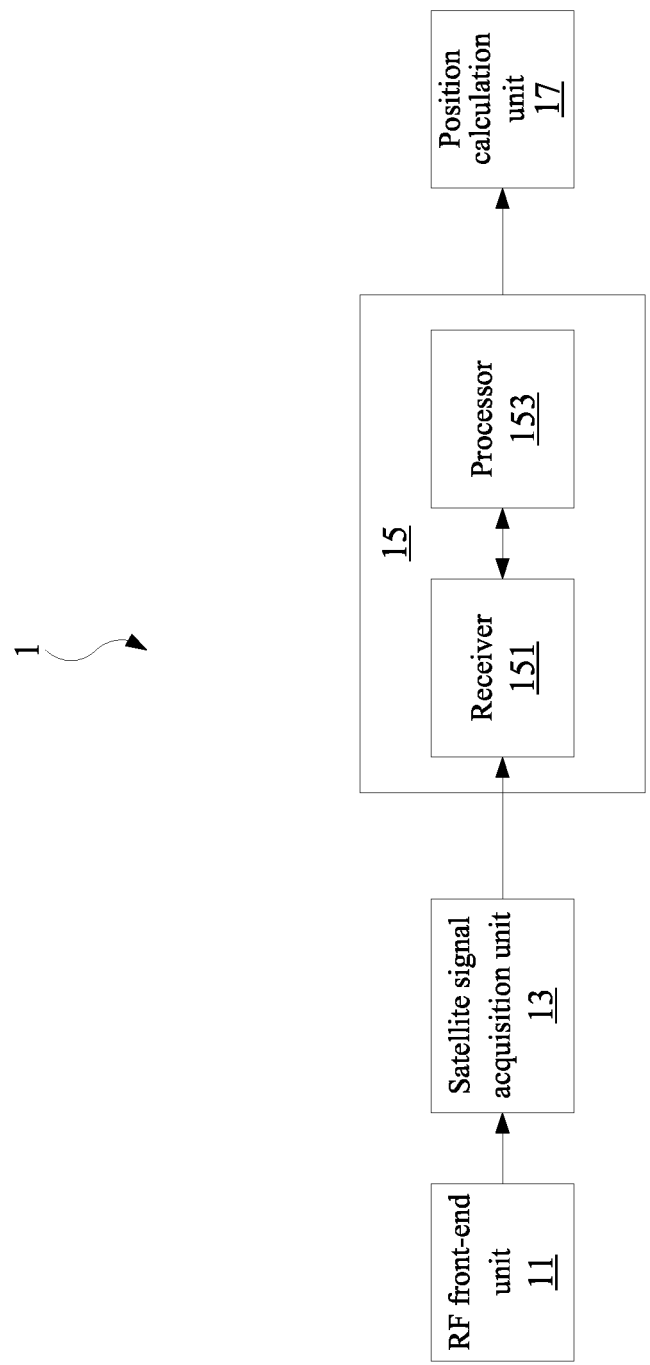
FIG. 1 is a schematic view of a satellite positioning receiving device 1 according to a first embodiment of the present invention.

A first embodiment of the present invention is as shown in FIG. 1, which depicts a satellite positioning receiving device 1. The satellite positioning receiving device 1 comprises a radio frequency (RF) front-end unit 11, a satellite signal acquisition unit 13, a satellite pseudorange calculation apparatus 15 and a position calculation unit 17. The satellite pseudorange calculation apparatus 15 comprises a receiver 151 and a processor 153 electrically connected to the receiver 151. The satellite positioning receiving device 1 may be implemented as, but not limited to, a mobile phone, a personal digital assistant (PDA), a digital camera, a notebook computer, a tablet computer or some other device that can be implemented by hardware, firmware or software and that has a satellite positioning function.

The RF front-end unit 11, which is used as a communication interface between satellites (not shown) visible on the earth and the satellite positioning receiving device 1, is configured to receive signals/data transmitted by the satellites and optionally transform the signals/data into a desired signal/data format for the satellite signal acquisition unit 13. The satellite signal acquisition unit 13 is configured to acquire satellite signals that the RF front-end unit 11 receives from the satellites, and calculate such parameters as code phases and Doppler Shifts transmitted by the satellites. The position calculation unit 17 is configured to calculate the current position of the satellite positioning receiving device 1 (i.e., the position of the user) according to the parameters calculated by the satellite pseudorange calculation apparatus 15, e.g., the pseudoranges between the satellites and the satellite positioning receiving device 1 and the absolute transmitting times of the satellites.

In principal, the RF front-end unit 11, the satellite signal acquisition unit 13 and the position calculation unit 17 described in this embodiment may be considered as an RF front-end unit, a satellite signal acquisition unit and a position calculation unit included in a conventional satellite positioning receiving device. Therefore, related operations and functions of the RF front-end unit 11, the satellite signal acquisition unit 13 and the position calculation unit 17 described in this embodiment can be appreciated by those of ordinary skill in the art and, thus, will not be further described herein.

Different from the conventional satellite positioning receiving device, the satellite pseudorange calculation device 15 described in this embodiment can directly calculate the pseudoranges between the satellites and the satellite positioning receiving device 1 and the absolute transmitting times of the satellites in the absence of a satellite ephemeris that would otherwise be provided by a satellite signal tracking unit. Then, the position calculation unit 17 can calculate the current position of the satellite positioning receiving device 1 (i.e., the position of the user) according to the pseudoranges between the satellites and the satellite positioning receiving device 1 and the absolute transmitting times of the satellites.

The pseudoranges between the satellites and the satellite positioning receiving device 1 may usually be measured in units of codes. Generally speaking, the pseudoranges between the satellites and the satellite positioning receiving device 1 are about 67 to 86 codes, with one code having a duration of 1 millisecond (ms). Then, a product of the total code number with the light speed (about $3 \times 10^8$ m/s) is just the pseudorange between a corresponding satellite and the satellite positioning receiving device 1. The total code number comprises a fractional code value and an integer code value. Therefore, once the fractional code value and the integer code value of the pseudorange between the satellite and the satellite positioning receiving device 1 are known, the pseudorange between the satellite and the satellite positioning receiving device 1 will be known directly.

Hereinbelow, operations of the satellite pseudorange calculation apparatus 15 in calculating the pseudoranges between the satellites and the satellite positioning receiving device 1 will be further described. For convenience of description, calculation of a pseudorange between a satellite and the satellite positioning receiving device 1 will be taken as an example, and calculations of pseudoranges between other satellites and the satellite positioning receiving device 1 will be readily known by those of ordinary skill in the art on the basis of the following descriptions.

The receiver 151 of the satellite pseudorange calculation apparatus 15 is configured to receive a code phase (not shown) corresponding to the satellite from the satellite signal acquisition unit 13, and the processor 153 is configured to calculate the fractional code value of the pseudorange between the satellite and the satellite positioning receiving device 1 according to the code phase. How to calculate the fractional code value of the pseudorange between the satellite and the satellite positioning receiving device 1 according to the code phase is known to those of ordinary skill in the art. In other words, the fractional code value is a parameter known to the satellite pseudorange calculation apparatus 15.

Generally speaking, the satellite transmits codes at a code rate of 1023 kHz, and the satellite positioning receiving device has a code sampling rate of 16368 kHz. Therefore, the processor 153 can obtain the fractional code value of the pseudorange between the satellite and the satellite positioning receiving device 1 by dividing the code phase by the aforesaid code sampling rate of the satellite positioning receiving device 1. For example, if the code phase is 8074, then the fractional code value is equal to 8074/16368=0.493 ms.

The processor 153 of the satellite pseudorange calculation apparatus 15 is further configured to define an approximation position, and calculate the integer code value of the pseudorange between the satellite and the satellite positioning receiving device 1 according to the approximation position and the fractional code value. More specifically, the processor 153 calculates the integer code value through the following operations: performing a linearization processing on the approximation position (e.g., calculating a Taylor expansion of the approximation position); calculating a unit vector matrix from the approximation position to the satellite according to the Taylor expansion; calculating an estimated fractional code value of the pseudorange between the satellite and the satellite positioning receiving device 1 according to the unit vector matrix and the fractional code value; and approximating the estimated fractional code value to the fractional code value by means of an iteration algorithm to calculate the integer code value.

Hereinafter, how the processor 153 calculates the integer code value will be further described by use of arithmetic expressions. However, the following description is not intended to limit the present invention. Firstly, a pseudorange observation equation between the satellite and the satellite positioning receiving device 1 may be represented as follows:

$$R_u = \rho_u + E \tag{1}$$

where $\rho_u$ represents a pseudorange between the satellite and the satellite positioning receiving device 1, E represents an error value. The error value may comprise a combination of an ionosphere delay error I, a troposphere delay error T, a clock error b and a system random error E and so on. Generally speaking, an error value of the pseudorange caused by the errors is less than one code. In other words, the errors are covered by one code.

According to the concept of geometric distance, a geometric distance $\rho_u$ between the satellite and the satellite positioning receiving device 1 may be represented as follows:

$$\rho_u = \sqrt{(x_u-x_i)^2+(y_u-y_i)^2+(z_u-z_i)^2} \tag{2}$$

where $(x_u, y_u, z_u)$ represents a geometric position of the satellite positioning receiving device 1, and $(x_i, y_i, z_i)$ represents a geometric position of the satellite. Furthermore, according to the geometric expression of Equation (2), a pseudorange observation equation between the satellite and the satellite positioning receiving device 1 may be represented as follows:

$$R_u = \sqrt{(x_u-x_i)^2+(y_u-y_i)^2+(z_u-z_i)^2} + E \tag{3}$$

The processor 153 may define an approximation position, and a geometric distance from the approximation position to the satellite may be represented as follows:

$$\rho_0 = \sqrt{(x_0-x_i)^2+(y_0-y_i)^2+(z_0-z_i)^2} \tag{4}$$

where the geometric position $(x_0, y_0, z_0)$ of the approximation position may be any position in a free space. Preferably, the geometric position $(x_0, y_0, z_0)$ of the approximation position B may be set to fall within a range visible to the satellite, but this is not intended to limit the present invention.

Next, the processor 153 may calculate a linearization processing on the approximation position. The linearization processing may be a Taylor expansion, which may be represented as follows:

$$\rho_u = \rho_0 + \frac{\partial \rho_u}{\partial x}(x_u - x_0) + \frac{\partial \rho_u}{\partial y}(y_u - y_0) + \frac{\partial \rho_u}{\partial x}(z_u - z_0) \tag{5}$$

Because the unit vector from the geometric position $(x_0, y_0, z_0)$ of the approximation position to the satellite may be represented as follows:

$$g_{xi} = \frac{\partial \rho_u}{\partial x} = \frac{(x_0 - x_i)}{\rho_0} \tag{6}$$

-continued $$g_{yi} = \frac{\partial \rho_u}{\partial y} = \frac{(y_0 - y_i)}{\rho_0}$$

$$g_{zi} = \frac{\partial \rho_u}{\partial z} = \frac{(z_0 - z_i)}{\rho_0}$$

the Taylor expansion shown in Equation (5) may be further represented as follows:

$$\rho_u = \rho_0 + g_{xi}(x_u - x_0) + g_{yi}(y_u - y_0) + g_{zi}(z_u - z_0) \quad (7)$$

By substituting Equation (7) into Equation (1), the pseudorange observation equation between the satellite and the satellite positioning receiving device 1 may be further represented as follows:

$$R_u = \rho_0 + g_{xi}(x_u - x_0) + g_{yi}(y_u - y_0) + g_{zi}(z_u - z_0) + E \quad (8)$$

Through transposition, Equation (8) may be further represented as follows:

$$[R_u - (\rho_0 + E)] = [g_{xi} \quad g_{yi} \quad g_{zi}] \begin{bmatrix} x_u - x_0 \\ y_u - y_0 \\ z_u - z_0 \end{bmatrix} \quad (9)$$

Finally, Equation (9) may be represented by a linear model as follows:

$$(y-N) = G\delta X \quad (10)$$

where, y is the observed pseudorange $R_u$ between the satellite and the satellite positioning receiving device 1, N is a sum of the geometric distance $\rho_0$ from the approximation position to the satellite and the error value E, G is the unit vector matrix $[g_{xi} \ g_{yi} \ g_{zi}]$ from the geometric position $(x_0, y_0, z_0)$ of the approximation position to the satellite, $\delta X$ is an offset matrix $[x_u - x_0 \ y_u - y_0 \ z_u - z_0]^T$ between the geometric position $(x_u, y_u, z_u)$ of the satellite positioning receiving device 1 and the geometric position $(x_0, y_0, z_0)$ of the approximation position.

By means of Equation (10), the processor 153 can calculate the estimated fractional code value of the geometric distance $\rho_u$ between the satellite and the satellite positioning receiving device 1 according to the unit vector matrix G and the fractional code value. Firstly, the processor 153 can estimate an estimated offset matrix between the geometric position $(x_u, y_u, z_u)$ of the satellite positioning receiving device 1 and the geometric position $(x_0, y_0, z_0)$ of the approximation position as follows:

$$\delta \hat{X} = (G^T G)^{-1} G^T (y-N) \quad (11)$$

Then, by substituting Equation (11) into Equation (10), the processor 153 can calculate the estimated fractional code value of the geometric distance $\rho_u$ between the satellite and the satellite positioning receiving device 1 according to the unit vector matrix G and the fractional code value as follows:

$$D = G(G^T G)^{-1} G^T (y-N) \quad (12)$$

where D just represents the estimated fractional code value.

If the error value E is not taken into account, then the observed pseudorange $R_u$ between the satellite and the satellite positioning receiving device 1 is just a sum of the integer code value and the fractional code value. In other words, a difference value obtained by subtracting the integer code value from the observed pseudorange $R_u$ between the satellite and the satellite positioning receiving device 1 is just the fractional code value. Because the processor 153 can calculate the fractional code value between the satellite and the satellite positioning receiving device 1 according to the code phase corresponding to the satellite that is received by the receiver 151 from the satellite signal acquisition unit 13, the fractional code value is a parameter known to the processor 153.

Then, the processor 153 can calculate the integer code value simply by using an iteration algorithm to approximate the estimated fractional code value to the fractional code value. Hereinbelow, a least square iteration algorithm will be used for purpose of description. However, the least square iteration algorithm described below is not intended to limit the present invention.

Specifically, the processor 153 will execute the following operations: defining a square error between the estimated fractional code value and the fractional code value; defining a cost function of the integer code value according to the square error; and searching for a minimum value of the square error through iteration according to the cost function to calculate the integer code value.

Firstly, the processor 153 calculates a residual error vector obtained by subtracting the estimated fractional code value from the fractional code value according to Equation (10) and Equation (12):

$$R = (y-N) - D = (y-N) - P(y-N) \quad (13)$$

where $P = G(G^T G)^{-1} G^T$.

Letting $(I-P) = Q$, then Equation (13) may be further represented as follows:

$$R = (y-N)Q \quad (14)$$

Next, the processor 153 calculates a square of the residual error vector obtained by subtracting the estimated fractional code value from the fractional code value, and defines a cost function of the integer code value according to the square as follows:

$$c(N) = (y-N)^T Q(y-N) \quad (15)$$

Finally, the processor 153 searches for a minimum value of the square error between the estimated fractional code value and the fractional code value through iteration according to the cost function of Equation (15) to calculate the integer code value. The integer code value ranges from 67 to 86.

So far, the integer code value and the fractional code value have been derived by the processor 153. Thus, the geometric distance $\rho_u$ between the satellite and the satellite positioning receiving device 1 has been derived by the processor 153. For the satellite positioning receiving device 1, the time taken by the satellite signal transmitted from the satellite to reach the satellite positioning receiving device 1 is already known, so the processor 153 can calculate an absolute transmitting time at which the satellite transmits the satellite signal, and calculates a satellite position according to the absolute transmitting time. Thus, the position calculation unit 17 now can receive from the satellite pseudorange calculation apparatus 15 parameters necessary for calculating the current position of the satellite positioning receiving device 1 (i.e., the position of the user), thus eliminating the need of providing the satellite ephemeris by the conventional satellite signal tracking unit.

In other embodiments, the satellite pseudorange calculation apparatus 15 of the present invention may also be used with the conventional satellite signal tracking unit in the satellite positioning receiving device 1. During the initial positioning (cold start), the satellite pseudorange calculation apparatus 15 provides the parameters necessary for calculating the current position of the satellite positioning receiving device 1 to the position calculation unit 17; and then, the satellite positioning receiving device 1 may be adaptively switched to a mode of providing the parameters (including the satellite ephemeris and so on) necessary for calculating the current position of the satellite positioning receiving device 1 from the conventional satellite signal tracking unit to the position calculation unit 17. In other words, the satellite pseudorange calculation apparatus 15 of the present invention can either be used to replace or be used with the conventional satellite signal tracking unit in the satellite positioning receiving device 1.

Figure 2:
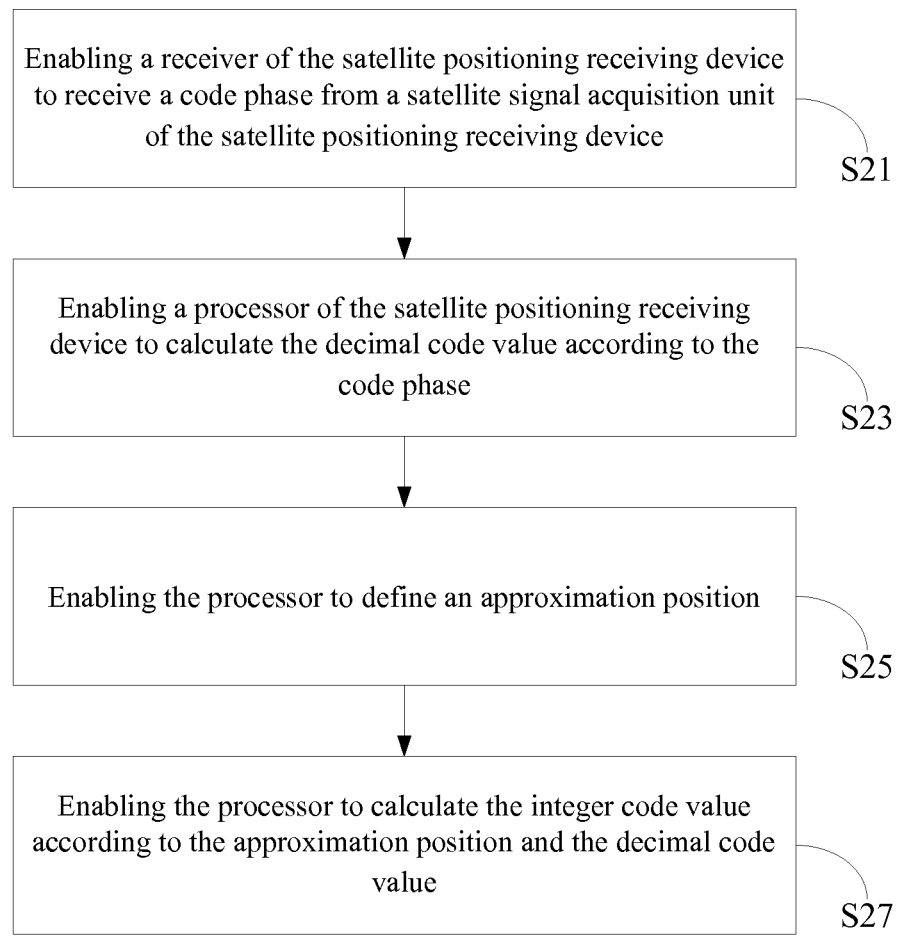
FIG. 2 is a flowchart diagram of a satellite pseudorange calculation method according to a second embodiment of the present invention.

A second embodiment of the present invention is shown in FIG. 2, which depicts a satellite pseudorange calculation method for calculating a pseudorange between a satellite and a satellite positioning receiving device. The pseudorange comprises an integer code value and a fractional code value. The satellite positioning receiving device described in this embodiment may be considered as the satellite positioning receiving device 1 described in the first embodiment, and a satellite pseudorange calculation apparatus described in this embodiment may be considered as the satellite pseudorange calculation apparatus 15 described in the first embodiment.

As shown in FIG. 2, step S21 is executed to enable a receiver of the satellite pseudorange calculation apparatus to receive a code phase from a satellite signal acquisition unit of the satellite pseudorange calculation apparatus. Step S23 is executed to enable a processor, which is electrically connected to the receiver, of the satellite pseudorange calculation apparatus to calculate the fractional code value according to the code phase. Step S25 is executed to enable the processor to define an approximation position. Step S27 is executed to enable the processor to calculate the integer code value according to the approximation position and the fractional code value.

Figure 2A:
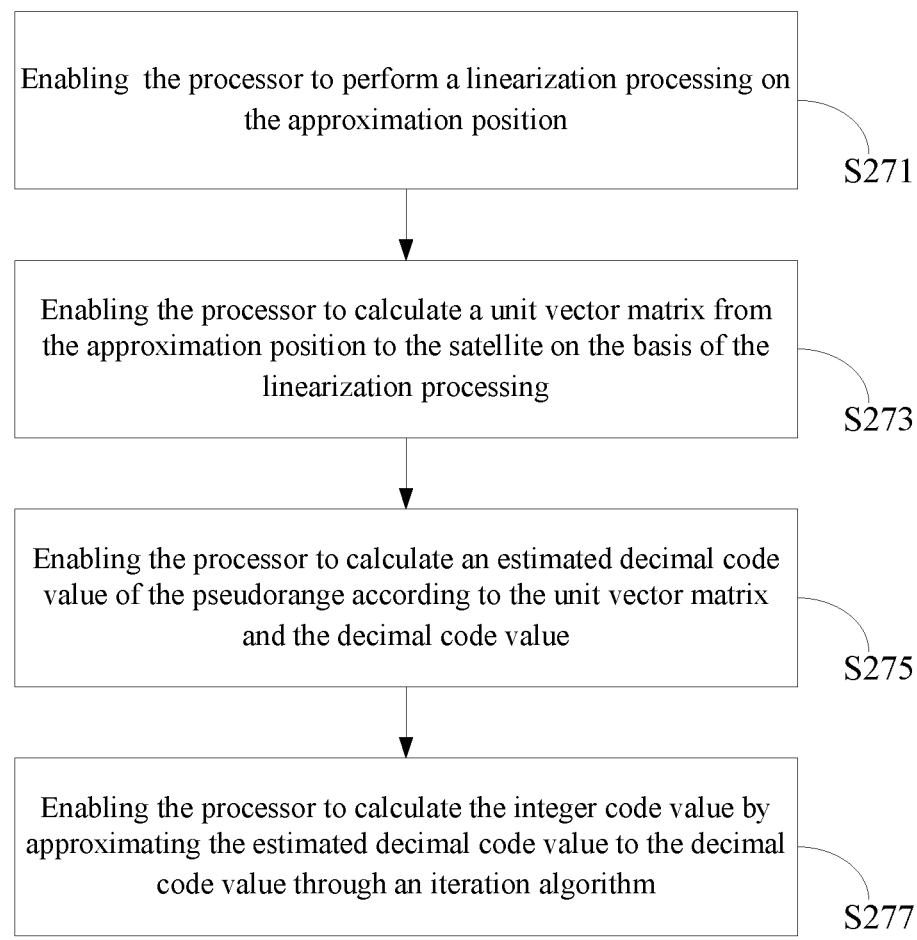
FIGS. 2A and 2B are detail flowchart diagrams of a satellite pseudorange calculation method according to a second embodiment of the present invention.

As shown in FIG. 2A, in other embodiments, the step S27 described in this embodiment further comprises the following steps: step S271 is executed to enable the processor to perform a linearization processing on the approximation position; step S273 is executed to enable the processor to calculate a unit vector matrix from the approximation position to the satellite on the basis of the linearization processing; step S275 is executed to enable the processor to calculate an estimated fractional code value of the pseudorange according to the unit vector matrix and the fractional code value; and step S277 is executed to enable the processor to calculate the integer code value by approximating the estimated fractional code value to the fractional code value through an iteration algorithm.

Figure 2B:
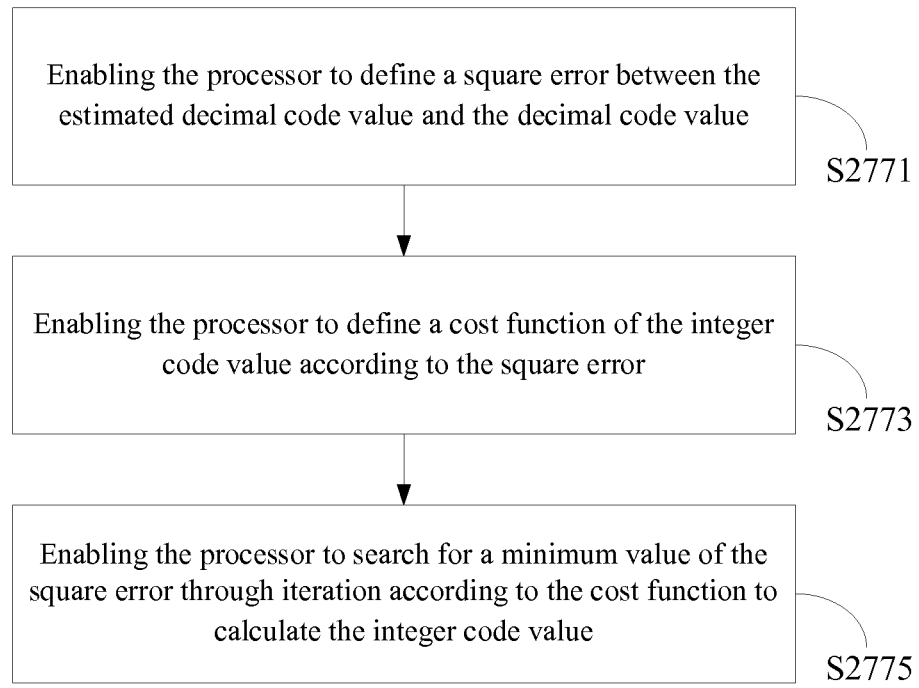

As shown in FIG. 2B, in other embodiments, the step S277 described herein further comprises the following steps: step S2771 is executed to enable the processor to define a square error between the estimated fractional code value and the fractional code value; step S2773 is executed to enable the processor to define a cost function of the integer code value according to the square error; and step S2775 is executed to enable the processor to search for a minimum value of the square error through iteration according to the cost function to calculate the integer code value.

In addition to the aforesaid steps, the satellite pseudorange calculation method of this embodiment can also execute all the operations set forth in the first embodiment and have all the corresponding functions. How the satellite pseudorange calculation method of this embodiment executes these operations and has these functions can be readily appreciated by those of ordinary skill in the art based on the explanation of the first embodiment, and thus will not be further described herein.

Figure 3:
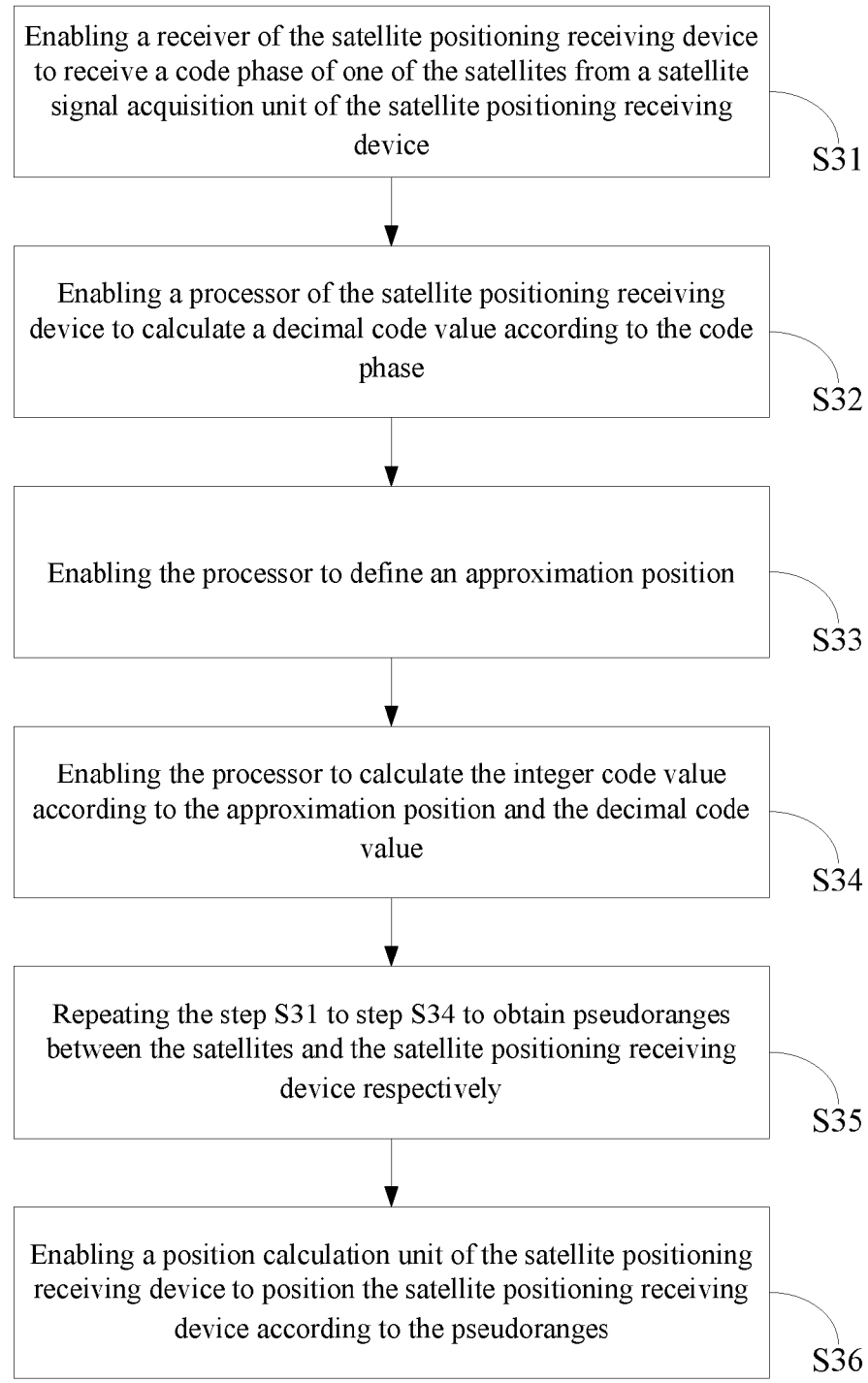
FIG. 3 is a flowchart diagram of a satellite positioning method according to a third embodiment of the present invention.

A third embodiment of the present invention is shown in FIG. 3, which depicts a satellite positioning method for positioning a satellite positioning receiving device. The satellite positioning receiving device has a pseudorange from each of a plurality of satellites respectively, and each pseudorange comprises an integer code value and a fractional code value. The satellite positioning receiving device described in this embodiment may be considered as the satellite positioning receiving device 1 described in the first embodiment, and a satellite pseudorange calculation apparatus described in this embodiment may be considered as the satellite pseudorange calculation apparatus 15 described in the first embodiment.

As shown in FIG. 3, step S31 is executed to enable a receiver of the satellite pseudorange calculation apparatus to receive a code phase of one of the satellites from a satellite signal acquisition unit of the satellite pseudorange calculation apparatus. Step S32 is executed to enable a processor, which is electrically connected to the receiver, of the satellite pseudorange calculation apparatus to calculate the fractional code value according to the code phase. Step S33 is executed to enable the processor to define an approximation position. Step S34 is executed to enable the processor to calculate the integer code value according to the approximation position and the fractional code value. In step 35, the aforesaid steps (i.e., step S31, step S32, step S33 and step S34) are repeated to obtain pseudoranges between the satellites and the satellite positioning receiving device respectively. Step S36 is executed to enable a position calculation unit, which is electrically connected to the processor, of the satellite positioning receiving device to position the satellite positioning receiving device according to the pseudoranges.

Figure 3A:
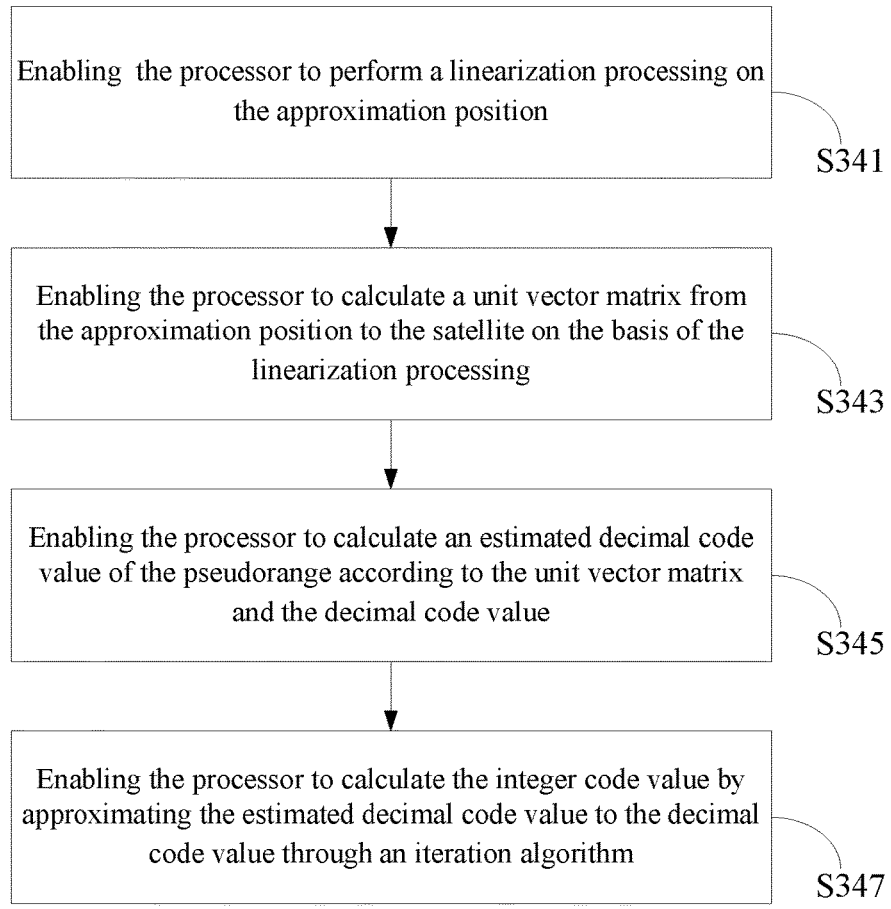
FIGS. 3A and 3B are detail flowchart diagrams of a satellite positioning method according to a third embodiment of the present invention.

As shown in FIG. 3A, in other embodiments, the step S34 described in this embodiment further comprises the following steps: step S341 is executed to enable the processor to perform a linearization processing on the approximation position; step S343 is executed to enable the processor to calculate a unit vector matrix from the approximation position to the satellite on the basis of the linearization processing; step S345 is executed to enable the processor to calculate an estimated fractional code value of the pseudorange according to the unit vector matrix and the fractional code value; and step S347 is executed to enable the processor to calculate the integer code value by approximating the estimated fractional code value to the fractional code value through an iteration algorithm.

Figure 3B:
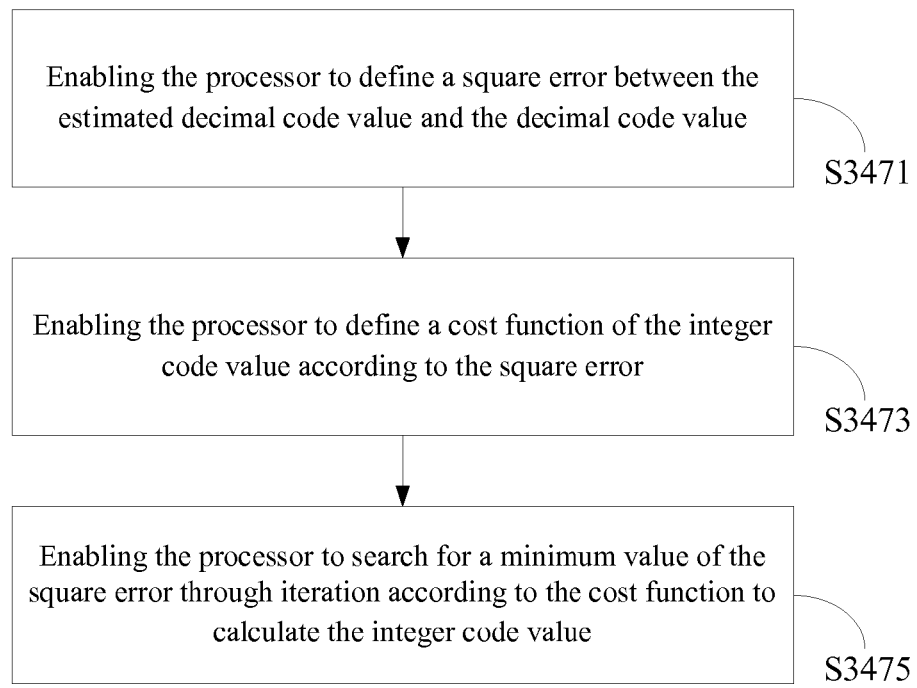

As shown in FIG. 3B, in other embodiments, the step S347 described herein further comprises the following steps: step S3471 is executed to enable the processor to define a square error between the estimated fractional code value and the fractional code value; step S3473 is executed to enable the processor to define a cost function of the integer code value according to the square error; and step S3475 is executed to enable the processor to search for a minimum value of the square error through iteration according to the cost function to calculate the integer code value.

In addition to the aforesaid steps, the satellite pseudorange calculation method of this embodiment can also execute all the operations set forth in the aforesaid embodiments and have all the corresponding functions. How the satellite pseudorange calculation method of this embodiment executes these operations and has these functions can be readily appreciated by those of ordinary skill in the art based on the explanation of the aforesaid embodiments, and thus will not be further described herein.

According to the above descriptions, the present invention provides a satellite positioning method, a satellite pseudorange calculation apparatus and a satellite pseudorange calculation method thereof. The satellite positioning method, the satellite pseudorange calculation apparatus and the satellite pseudorange calculation method thereof of the present invention allow the conventional satellite positioning receiving device to, in the absence of the satellite ephemeris, directly calculate the pseudorange between the satellite and the satellite positioning receiving device and the absolute transmitting time of the satellite to know the position of the satellite. Then, the position of the user (i.e., the satellite positioning receiving device) can be derived. In other words, the satellite positioning method, the satellite pseudorange calculation apparatus and the satellite pseudorange calculation method thereof of the present invention can be used to replace or be used with the satellite signal tracking unit of the conventional satellite positioning receiving device. Therefore, it can be effectively improved that the conventional satellite positioning receiving device is with slow initial positioning speed because the satellite signal tracking unit thereof must spend much time to download and process a whole satellite ephemeris from the satellite.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A satellite pseudorange calculation apparatus, being configured to calculate a pseudorange between a satellite and a satellite positioning receiving device, and the pseudorange comprising an integer code value and a fractional code value, the satellite pseudorange calculation apparatus comprising:
a receiver, being configured to receive a code phase from a satellite signal acquisition unit; and
a processor electrically connected with the receiver, being configured to execute the following operations:
calculating the fractional code value according to the code phase;
defining an approximation position; and
calculating the integer code value according to the approximation position and the fractional code value to get the pseudorange for positioning the satellite positioning receiving device;
wherein the processor is further configured to execute the following operations:
performing a linearization processing on the approximation position;
calculating a unit vector matrix from the approximation position to the satellite on the basis of the linearization processing;
calculating an estimated fractional code value of the pseudorange according to the unit vector matrix and the fractional code value; and
approximating the estimated fractional code value to the fractional code value by means of an iteration algorithm to calculate the integer code value.

2. The satellite pseudorange calculation apparatus as claimed in claim 1, wherein the processor executes the following operations by means of the iteration algorithm:
defining a square error between the estimated fractional code value and the fractional code value;
defining a cost function of the integer code value according to the square error; and
searching for a minimum value of the square error through iteration according to the cost function to calculate the integer code value.

3. The satellite pseudorange calculation apparatus as claimed in claim 1, wherein the approximation position falls within a range visible to the satellite.

4. A satellite pseudorange calculation method for calculating a pseudorange between a satellite and a satellite positioning receiving device, the pseudorange comprising an integer code value and a fractional code value, the satellite pseudorange calculation method comprising the following steps of:
(a) enabling a receiver of the satellite positioning receiving device to receive a code phase from a satellite signal acquisition unit of the satellite positioning receiving device;
(b) enabling a processor, which is electrically connected to the receiver, of the satellite positioning receiving device to calculate the fractional code value according to the code phase;
(c) enabling the processor to define an approximation position; and
(d) enabling the processor to calculate the integer code value according to the approximation position and the fractional code value to get the pseudorange for positioning the satellite positioning receiving device;
wherein the step (d) further comprises the following steps of:
(d1) enabling the processor to perform a linearization processing on the approximation position;
(d3) enabling the processor to calculate a unit vector matrix from the approximation position to the satellite on the basis of the linearization processing;
(d5) enabling the processor to calculate an estimated fractional code value of the pseudorange according to the unit vector matrix and the fractional code value; and
(d7) enabling the processor to calculate the integer code value by approximating the estimated fractional code value to the fractional code value through an iteration algorithm.

5. The satellite pseudorange calculation method as claimed in claim 4, wherein the step (d7) further comprises the following steps of:
(d71) enabling the processor to define a square error between the estimated fractional code value and the fractional code value;
(d73) enabling the processor to define a cost function of the integer code value according to the square error; and
(d75) enabling the processor to search for a minimum value of the square error through iteration according to the cost function to calculate the integer code value.

6. The satellite pseudorange calculation method as claimed in claim 4, wherein the approximation position falls within a range visible to the satellite.

7. A satellite positioning method for positioning a satellite positioning receiving device, the satellite positioning receiving device having a pseudorange from each of a plurality of satellites respectively, and each of the pseudoranges comprising an integer code value and a fractional code value, the satellite positioning method comprising the following steps of:
(a) enabling a receiver of the satellite positioning receiving device to receive a code phase of one of the satellites from a satellite signal acquisition unit of the satellite positioning receiving device;
(b) enabling a processor, which is electrically connected to the receiver, of the satellite positioning receiving device to calculate the fractional code value according to the code phase;
(c) enabling the processor to define an approximation position;
(d) enabling the processor to calculate the integer code value according to the approximation position and the fractional code value;
(e) repeating the step (a) to step (d) to obtain the pseudoranges between the satellites and the satellite positioning receiving device respectively; and
(f) enabling a position calculation unit, which is electrically connected to the processor, of the satellite positioning receiving device to position the satellite positioning receiving device according to the pseudoranges;
wherein the step (d) further comprises the following steps of:
(d1) enabling the processor to perform a linearization processing on the approximation position;
(d3) enabling the processor to calculate a unit vector matrix from the approximation position to the satellite on the basis of the linearization processing;
(d5) enabling the processor to calculate an estimated fractional code value of the pseudorange according to the unit vector matrix and the fractional code value; and
(d7) enabling the processor to calculate the integer code value by approximating the estimated fractional code value to the fractional code value through an iteration algorithm.

8. The satellite positioning method as claimed in claim 7, wherein the step (d7) further comprises the following steps of:
(d71) enabling the processor to define a square error between the estimated fractional code value and the fractional code value;
(d73) enabling the processor to define a cost function of the integer code value according to the square error; and
(d75) enabling the processor to search for a minimum value of the square error through iteration according to the cost function to calculate the integer code value.

9. The satellite positioning method as claimed in claim 7, wherein the approximation position falls within a range visible to the satellite.

* * * * *